US009141350B2

(12) United States Patent
Stravers et al.

(10) Patent No.: US 9,141,350 B2
(45) Date of Patent: Sep. 22, 2015

(54) EMBEDDED SYSTEM PERFORMANCE

(75) Inventors: Paul Stravers, Eindhoven (NL); Jos Van Eijndhoven, Eindhoven (NL); Martijn Rutten, Eindhoven (NL); Alexey Rodriguez, Eindhoven (NL); Wouter Swierstra, Eindhoven (NL); Maurice Kastelijn, Eindhoven (NL)

(73) Assignee: Vector Fabrics B.V. (NL)

( * ) Notice: Subject to any disclaimer, the term of this patent is extended or adjusted under 35 U.S.C. 154(b) by 368 days.

(21) Appl. No.: 13/641,830

(22) PCT Filed: Apr. 20, 2011

(86) PCT No.: PCT/NL2011/050269
§ 371 (c)(1),
(2), (4) Date: Dec. 6, 2012

(87) PCT Pub. No.: WO2011/133030
PCT Pub. Date: Oct. 27, 2011

(65) Prior Publication Data
US 2013/0080993 A1 Mar. 28, 2013

(30) Foreign Application Priority Data
Apr. 23, 2010 (NL) ..................................... 2004602

(51) Int. Cl.
*G06F 9/44* (2006.01)
*G06F 9/45* (2006.01)
(52) U.S. Cl.
CPC . *G06F 8/35* (2013.01); *G06F 8/433* (2013.01)
(58) Field of Classification Search
None
See application file for complete search history.

(56) References Cited

U.S. PATENT DOCUMENTS

| 7,418,583 | B2  |   | 8/2008  | Shibayama et al. |         |
|-----------|-----|---|---------|------------------|---------|
| 7,694,253 | B2  | * | 4/2010  | Campos et al.    | 716/106 |
| 8,046,751 | B1  | * | 10/2011 | Avadhanula et al.| 717/156 |
| 8,161,502 | B2  |   | 4/2012  | Peng et al.      |         |
| 8,458,671 | B1  | * | 6/2013  | Hostetter et al. | 717/131 |

(Continued)

FOREIGN PATENT DOCUMENTS

EP           1569104 A2 *  8/2005  ................ G06F 9/45

OTHER PUBLICATIONS

Tomas Blanch, F, International Patent Application No. PCT/NL2011/050269 Search Report and Written Opinion, Sep. 7, 2011, Publisher: PCT, Published in: NL.

(Continued)

*Primary Examiner* — Don Wong
*Assistant Examiner* — Roberto E Luna
(74) *Attorney, Agent, or Firm* — Kaplan Breyer Schwarz & Ottesen, LLP

(57) ABSTRACT

A method of generating an embedded system (4999) from an original computer program (996) which embedded system (4999) provides a parallellized hardware (4598) and software (4599) implementation of the original computer program (996), which parallellized implementation (4598, 4599) satisfies one or more criteria regarding hardware constraints of the embedded system (4999).
The system provides partitioning of functionality from the original computer program (996) using structural and behavioral program models and detects streaming and memory dependencies to improve the partitioning, relying on added indications of source lines and variables in said original computer program to relate partitions and dependencies in the program model with locations in the original program source code.

9 Claims, 18 Drawing Sheets

(56) References Cited

U.S. PATENT DOCUMENTS

| | | | |
|---|---|---|---|
| 8,726,392 B1* | 5/2014 | McCorkendale et al. | 726/25 |
| 8,826,255 B1* | 9/2014 | Avadhanula et al. | 717/156 |
| 2004/0103410 A1 | 5/2004 | Sakai | |
| 2005/0188364 A1* | 8/2005 | Cockx et al. | 717/159 |
| 2006/0031815 A1* | 2/2006 | Bhagia et al. | 717/106 |
| 2006/0225061 A1* | 10/2006 | Ludwig et al. | 717/161 |
| 2007/0294655 A1* | 12/2007 | Campos et al. | 716/12 |
| 2008/0127113 A1* | 5/2008 | Wu et al. | 717/129 |
| 2008/0278195 A1* | 11/2008 | Goodnow et al. | 326/38 |
| 2009/0077360 A1* | 3/2009 | Liu et al. | 712/233 |
| 2009/0282393 A1* | 11/2009 | Costa et al. | 717/132 |
| 2009/0319761 A1* | 12/2009 | Bostanci et al. | 712/226 |
| 2010/0042981 A1 | 2/2010 | Dreyer et al. | |
| 2010/0083289 A1* | 4/2010 | Peng et al. | 719/330 |
| 2010/0199257 A1* | 8/2010 | Biggerstaff | 717/104 |
| 2011/0069692 A1* | 3/2011 | Palkovic | 370/342 |
| 2012/0144376 A1* | 6/2012 | Van Eijndhoven et al. | 717/146 |
| 2012/0167061 A1* | 6/2012 | Kirovski et al. | 717/132 |
| 2012/0272209 A1* | 10/2012 | Biglari et al. | 717/105 |
| 2013/0086562 A1* | 4/2013 | Pistoia et al. | 717/132 |
| 2013/0212563 A1* | 8/2013 | Kraft | 717/123 |

OTHER PUBLICATIONS

Girkar, et al., "Automatic Extraction of Functional Parallelism from Ordinary Programs", "IEEE Service Center; Los Alamitos, CA", Mar. 1, 1992, pp. 166-178, vol. 3, No. 2, Publisher: IEEE Transactions on Parallel and Distributed Systems, Published in: US.

Janssen, et al. , "Controlled Node Splitting", 1996, pp. 1-12, Publisher: Delft University of Technology, Published in: NL.

Kahn, Giles, "The Semantics of a Simple Language for Parallel Programming", "Information Processing 74—Formal Models of Parallel Computation", 1974, pp. 471-475, Publisher: North-Holland Publishing Company, Published in: FR.

* cited by examiner

997

```c
#include <stdio.h>
#include "types.h"
include <stdlib.h> main()
{
  FILE *rgb_fp;
  FILE *yuv_fp;
  int x_sz = 64;
  int y_sz = 48;
  int sz = x_sz * y_sz;
  int8_t *rp = malloc(sz);
  int8_t *gp = malloc(sz);
  int8_t *bp = malloc(sz);
  int8_t *yp = malloc(sz);
  int8_t *up = malloc(sz);
  int8_t *vp = malloc(sz);
  int n=0;
  rgb_fp = fopen("pict.rgb", "r");
  if (rgb_fp == NULL)
  {
    perror("Error: cannot read pict.rgb");
    exit(1);
  }
  yuv_fp = fopen("pict.yuv", "w");
  if (yuv_fp == NULL)
  {
    perror("Error: cannot write pict.yuv");
    exit(1);
  }
  while (read_rgb(rgb_fp, sz, rp, gp, bp) == sz)
  {
    printf("Converting picture #%d\n", ++n);
    rgb2yuv(x_sz, y_sz, rp, gp, bp, yp, up, vp);
    write_yuv(yuv_fp, sz, yp, up, vp);
  }
  fclose(rgb_fp);
  fclose(yuv_fp);
  return 0;
} int read_rgb(FILE *fp, int sz,
             int8_t *rp, int8_t *gp, int8_t *bp)
{
  int i;
  for (i = 0; i < sz; ++i)
  {
    int c;
    if ((c = fgetc(fp)) == EOF) return i;
    *rp++ = c;
    if ((c = fgetc(fp)) == EOF) return i;
    *gp++ = c;
    if ((c = fgetc(fp)) == EOF) return i;
    *bp++ = c;
  }
  return i;
} int write_yuv(FILE *fp, int sz,
              int8_t *yp, int8_t *up, int8_t *vp)
{
  int i;
  for (i = 0; i < sz; ++i)
  {
    int c;
    c = *yp++;
    if (fputc(c,fp) == EOF) return i;
    c = *up++;
    if (fputc(c,fp) == EOF) return i;
    c = *vp++;
    if (fputc(c,fp) == EOF) return i;
  }
  return i;
}
```

```c
#include "types.h"
include <stdint.h> void rgb2yuv(int x_sz, int y_sz,
             int8_t *rp, int8_t *gp, int8_t *bp,
             int8_t *yp, int8_t *up, int8_t *vp)
{
    int i;
    int i_max = x_sz * y_sz;
    for (i = 0; i < i_max; ++i)
    {
        int16_t y,u,v;
        int16_t r,g,b;
        /* load the RGB pixel */
        r = *rp++;
        g = *gp++;
        b = *bp++;
        /* perform color space transformation */
        y = 66 * r + 129 * g + 25 * b;
        u = -38 * r - 74 * g + 112 * b;
        v = 112 * r - 94 * g - 18 * b;
        /* round to 8 bit */
        y = (y + 128) >> 8;
        u = (u + 128) >> 8;
        v = (v + 128) >> 8;
        /* add bias and store in YUV memory */
        *yp++ = y +16;      /* shift to [16,235] range */
        *up++ = u +128;     /* shift to [16,239] range */
        *vp++ = v +128;     /* shift to [16,239] range */
    }
}
```

FIG. 4-2

```
        .file     "rgb2yuv.c"
        .source   "src/rgb2yuv.c"
        .section          .text.rgb2yuv, "ax",@progbits
        .align    4
        .global   $rgb2yuv
        .type     $rgb2yuv, @function
$rgb2yuv:
        enter @value, @args u0/sw u1/sw a0/p/sb a1/p/sb a2/p/sb,
 a3/p/sb a4/p/sb a5/p/sb, @varargs , @no_frame, @locals 0 " ", @outargs 0, @save
        [2] u13/p/sb = [1]mov [2]a0/p/sb
        [3] u12/p/sb = [1]mov [3]a1/p/sb
        [4] u11/p/sb = [1]mov [4]a2/p/sb
        [5] u10/p/sb = [1]mov [5]a3/p/sb
        [6] u9/p/sb = [1]mov [6]a4/p/sb
        [7] u8/p/sb = [1]mov [7]a5/p/sb
        [9] u7/sw = [8]mul [10]u1/sw, [11]u0/sw
        [12] u6/sw = [8]mov 0
        jmp $.L2
$.L3:
        a1 = [13]mov [2]u13/p/sb
        a0 = [13]add a1, [12]u6/sw
        [14]u2/sw = [13]lds.b a0
        a1 = [13]mov [3]u12/p/sb
        a0 = [13]add a1, [12]u6/sw
        [15]u4/sw = [13]lds.b a0
        a1 = [13]mov [4]u11/p/sb
        a0 = [13]add a1, [12]u6/sw
        [16]u5/sw = [13]lds.b a0
        u3 = [17]mul [15]u4/sw, 129
        u0 = [17]mul [14]u2/sw, 66
        u3 = [17]add.h u3, u0
        u0 = [17]mul [16]u5/sw, 25
        u3 = [17]add.h u3, u0
        u3 = [17]cvt.sw.sh u3
        u3 = [17]add u3, 128
        u0 = [18]mul [16]u5/sw, 112
        u1 = [18]mul [14]u2/sw, -38
        u0 = [18]add.h u0, u1
        u1 = [18]mul [15]u4/sw, 74
        u0 = [18]sub.h u0, u1
        u0 = [18]cvt.sw.sh u0
        u0 = [18]add u0, 128 u2 = [19]mul [14]u2/sw, 112
        u4 = [19]mul [15]u4/sw, 94
        u2 = [19]sub.h u2, u4
        u5 = [19]mul [16]u5/sw, 18
        u2 = [19]sub.h u2, u5
        u2 = [19]cvt.sw.sh u2
        u2 = [19]add u2, 128
        a1 = [20]mov [5]u10/p/sb
        a0 = [20]add a1, [12]u6/sw
        [21]u3/sw = [20]shiftr u3, 8
        u3 = [20]add.b [21]u3/sw, 16
        [20]st.b a0, u3
        a1 = [22]mov [6]u9/p/sb
        a0 = [22]add a1, [12]u6/sw
        [23]u0/sw = [22]shiftr u0, 8
        u0 = [22]add.b [23]u0/sw, -128
        [22]st.b a0, u0
        a1 = [24]mov [7]u8/p/sb
        a0 = [24]add a1, [12]u6/sw
        [25]u2/sw = [24]shiftr u2, 8
        u2 = [24]add.b [25]u2/sw, -128
        [24]st.b a0, u2
        [12]u6/sw = [26]add [12]u6/sw, 1
```

FIG. 6-1

$.L2:
```
g0 = [26]cmpge [12]u6/sw, [9]u7/sw
if (!g0) [26]jmp $.L3
leave
.size $rgb2yuv, .-$rgb2yuv
.ident "GCG: (GNU) 4.2.2"

.section .vfloc
.long 26
.long 2
.string "src/rgb2yuv.c"
.long 7
.string "@"
.long 1
.byte 0
.long 9
.string "@"
.long 8
.byte 0
.long 10
.string "@"
.long 26
.byte 0
.long 19
.string "@"
.long 13
.byte 0
.long 23
.string "@"
.long 17
.byte 0
.long 24
.string "@"
.long 18
.byte 0
.long 25
.string "@"
.long 19
.byte 0
.long 27
.string "@"
```

▶ .long 20
.byte 0
.long 28
.string "@"
.long 22
.byte 0
.long 29
.string "@"
.long 24
.byte 0
.long -1
.string ""
.long 0
.string "D. 2242"
.long 25
.string "D. 2239"
.long 23
.string "D. 2236"
.long 21
.string "D. 2214"
.long 16
.string "D. 2210"
.long 15
.string "D. 2207"
.long 14
.string "i"

FIG. 6-2

EMBEDDED SYSTEM PERFORMANCE

BACKGROUND OF THE INVENTION

Embedded systems are in widespread use, for example in consumer electronics (televisions, mobile phones, microwaves, cameras, etc.), cars, industrial robots and telecommunication systems. Embedded systems are made up of a combination of special-purpose hardware and software, designed to function optimally for the desired purpose. They differ from personal computer systems because the hardware and software is specifically designed for a limited number of functions, and the system must meet several constraints, for example on response time, power consumption, cost, size, weight or form factor.

The use of embedded systems is growing rapidly, as is their complexity. The design of embedded systems therefore is receiving increased attention, in particular with regards to performance and stability of the systems. An important aspect of embedded system design is determining which parts to implement in which processor to allow parallel execution, in which the processors are programmable RISC or DSP type processors and/or dedicated accelerators. Traditionally, this determination is almost entirely done manually, which is very time consuming. Therefore, only few partitioning options can be explored. As a result it is hard to guarantee that an optimal solution has been created that optimally satisfies the design constraints.

Partially automated techniques for creating multi-processor systems do exist but have significant constraints. One constraint in particular is that most of these techniques require the use of a domain-specific language for which the tools can easier identify opportunities for parallelism. An example is the use of CleanC to limit the programming constructs and control flow to constructs that can be statically analyzed. Similarly, design tools based on SystemC force the user to manually rewrite the functional specification into a parallel description, where the design tool only implements low-level mapping of the parallel SystemC modules to actual processors.

Such restrictions hamper the reuse of existing code. Such code has to be rewritten to conform to the limitations of the chosen language, which may not even be possible in all cases. The resulting code in addition is specific to a certain hardware platform or configuration.

What is desired is a tool that can address the problem of transforming arbitrary software source code into an improved partitioning to multiple processors.

SUMMARY OF THE INVENTION

The invention advantageously provides a method, system and computer program product for generating an embedded system from an original computer program, which embedded system provides a parallel hardware and/or software implementation of the original computer program, which parallel implementation satisfies one or more criteria regarding hardware constraints of the embedded system. Such constraints may be found in reduced costs or circuit board space, faster operating or response time or a better choice for specific hardware components. The choices in this partitioning can be made depending on various circumstances, such as hardware restrictions, desired application, response time or cost. Choices may even differ for the same source code, as the same code can be useful in different devices that have different constraints.

The system provides partitioning of functionality from the original computer program using structural and behavioral program models and detects streaming and memory dependencies to improve the partitioning, relying on added indications of source lines and variables in said original computer program to relate partitions and dependencies in the program model with locations in the original program source code.

The invention permits developers to focus on the high-level functional description in languages such as C without requirements for manual editing, translation or tuning of this high-level code to explore different system partitions This approach allows the product designer to view the impact of his decisions from an architectural perspective on the final implementation. This is of course where the biggest bang for the buck can be achieved and not further down the design flow where optimization takes place on the level of assembly, gates or wires. The invention can work with programmable CPUs, DSPs, FPGAs, and/or dedicated ASICs.

Program Modeling

The invention is provided by the characterizing part of claim 1. In the process of generating an embedded system, a first step is construction of a behavioral model of the program. To this end, the source code of the original program is compiled and analyzed to construct a structural model of the program. The compiled program is also executed with relevant input data sets and its run-time behavior is analyzed to construct a behavioral model. The invention provides in this first aspect for construction of an improved behavioral model in which all partition decisions are correct, that is the semantics of the original program are preserved by the partitioned program. In particular, the step of partitioning should comprise:

a) detecting a streaming dependency between load and store instructions and introducing a separation of these instructions into different partitions, b) detecting a memory dependency with synchronisation protection and introducing a separation of its load and store instructions into different partitions, and c) detecting another memory dependency and retaining its load and store instructions in the same partition.

The inventors have found that for the correctness of the partitioning it is important to ensure that (1) it does not separate the load/store instructions that contribute to a memory dependency, and (2) load and store instructions streaming dependencies are separated. Preferably, this second item comprises causing all load instructions for the detected streaming dependency to be in a single first task and all corresponding store instructions to be in a single second task. Optionally, the step of causing the load instruction to be in a different task from the corresponding store instruction is only applied if the task in which the load and the store instruction are is an active task.

This step of separating load and store instructions requires the collection of certain information regarding load/store instructions during this first step. In an embodiment therefore the step of subjecting the original computer program to static and dynamic program analysis comprises adding to the structural and behavioral program models at least one of: the run time of every function invocation, the run time of every loop body invocation, the number of times each loop body is executed, indications of memory dependencies and indications of streaming dependencies. This mechanism allows for reuse of the original address of a load/store operation, even though the data items are now handles by a buffered communication channel.

More specifically, in a preferred embodiment the information collected in the behavioral model comprises one or more of

- execution delay of individual functions and loop bodies. This is used to find a partitioning that implements a good load balance between the tasks; Balancing the load over the tasks is critical in achieving reduced execution delay.
- for each loop the average repeat count and the minimum and maximum repeat counts; This is used to determine if the overhead introduced by task creation and inter-task communication can be compensated by the speedup obtained from loop distribution and loop parallelization. Loops with a small repeat count have limited speedup.
- the communication that occurs between all store and load instructions in the program (so-called memory dependencies); This is used to verify that no partitions are created that violate the semantics of the original program.
- specific access patterns (so-called streaming patterns) among said store and load instructions. This is used to verify that no partitions are created that violate the semantics of the original program, and to select partitions that match well with the access patterns and therefore result in higher speedup.
- Detailed information about how each instruction and program variable captured in the model relates to source code locations in the original program.

Further in the process of generating an embedded system, a choice of items to partition must be made. While a fully automatic choice of items is certainly possible, it is often preferred to provide users with a means to input their preferences. This gives a user more control over the partitioning and allows the taking into account of non-functional requirements. In addition, such an interactive approach points the user to problematic parts of the program, that is, performance-critical parts of the program that need parallelization but for which no favorable partitioning exists unless the original source code is adapted, for example by moving a memory dependency from such a critical place to a less critical place in the program.

Code Generation

In the process of generating an embedded system, the behavioral model is translated into a parallel hardware and/or software implementation. In accordance with the invention, the step of subjecting the original computer program to static and dynamic program analysis comprises adding to the structural and behavioral program models indications of source lines and variables in said original computer program to relate partitions and dependencies in the program model with locations in the original program source code. Next, the preferred design is specified by means of a series of changes to be made to the original computer program, based at least in part on the added indications. Subsequently, the series of changes is applied to the original computer program and the thus-changed original computer program is used in the building of the embedded system.

Preferably this series of changes is generated as a sequence of source code edit steps that correspond one-to-one with the partition decisions that were applied to the model. This requires a behavioral model that contains very detailed information about the origin of each program instruction and program variable. In other words, the model needs to provide information about which original program source lines correspond to each part of the model. This way a user can make manual improvements to the source code that is the result of the partitioning. The edits further provide a clear overview of the changes that result from this partitioning.

As an alternative to this improvement the changes can be translated into new source code by a process of reverse compiling or mapping the series into source code items that are functionally equivalent to the original source code. This also provides a user the option to review & manually alter the source code of program as partitioned earlier but does not give him the aforementioned overview.

Yet another option is to translate the refined behavior model directly into object code and/or hardware designs. This option is faster than generating edited source code but has the disadvantage that an operator cannot make manual improvements to the code that is the result of the partitioning or review the changes resulting from partitioning.

In an embodiment the step of subjecting comprises additionally adding to the structural and behavioral program models indications of at least the size of a buffer used for communication between tasks, and the step of mapping further comprises providing a function to bijectively map any address in a memory address range of a size corresponding to the size of the buffer to a virtual address range such that any address range [aa . . . aa+size−1] is mapped bijectively on the offset range [0 . . . size−1], where 'size' represents a number that is at least the size of the buffer. This embodiment addresses an issue that arises when the original program performs an address computation and uses this computed address to store a data item. If this store instruction is later changed into a stream write operation by the editing process described above, the question remains to which address in the communication channel buffer said data item must be written.

The inventors have realized that in fact it does not matter which offset is used, as long as writer and reader side use the same offset for the same data item. Using this observation we can apply a function F to the original address aa such that any address range [aa . . . aa+size−1] is mapped bijectively on the offset range [0 . . . size−1]. In this formula size represents any number that is at least the size of the required buffer as detected by the stream pattern detector.

Optionally the step of deriving derives a plurality of design alternatives that each satisfy the one or more criteria, and is followed by a step of selecting the preferred design from the plurality of design alternatives. Preferably then the step of selecting involves calculating an impact of at least one aspect of each of the design alternatives and selecting the preferred design as the one of the design alternatives whose impact best fits a predetermined criterion. In an embodiment the step of selecting involves presenting the design alternatives to an operator using a user interface and receiving an indication of the preferred design using an input mechanism of the user interface.

In a further embodiment the step of deriving involves presenting said structural and behavioral models as a seed design to an operator using a graphical user interface and receiving an indication of a preferred invocation for deriving the preferred design, in which the graphical user interface presents the invocations in said seed design as boxes and the data dependencies as lines, where the width of each box is dependent on the execution delay of the corresponding invocation. Preferably, the step of deriving a design involves presenting partitioning options to an operator using a user interface and receiving an indication of the preferred partitioning option.

The user interface advantageously makes it obvious how much data is being communicated across any potential partition boundary and consequently what the cost would be if that boundary was actually used for partitioning. Also, an estimate of the effort to implement the partition is provided, for example by providing an estimate of the number of required source code changes. In a first embodiment of this aspect of the invention the user interface features the functions and loops that cause most of the program's execution delay more prominently (i.e. displaying them larger) than the others. In another embodiment of this aspect, the nature of memory dependencies (i.e. streaming dependency or not) is indicated very explicitly in the display (i.e. using distinct colors). The net result of this aspect of the invention is that it becomes obvious for the user which parts of the model he needs to partition into parallel tasks to achieve his non-functional requirements.

In an embodiment the step of receiving the indication of the preferred partitioning option involves calculating an impact of at least one aspect of each of the partitioning options and selecting the preferred option as the one of the partitioning options whose impact best fits a predetermined criterion. The impact preferably relates to the aspect of an estimated execution speed of each of the design alternatives.

In a further embodiment the user is given a means to change the model according to his partition decisions as outlined above. For example, the user can point to a particular partition boundary on the display. The user can alternatively point to a particular loop or function (invocation) that he thinks needs to be partitioned to get closer to the overall non-functional requirements, and the invention then presents the user with a list of partitioning options for that invocation, each annotated with costs and benefits.

In accordance with the aforementioned first aspect of the invention any partition decision (whether fully automatic or user-specified) made during this step may be subjected to a check to verify that the partition satisfies the above requirements for correctness. In embodiments in which the user makes a partition decision it is then required to
(1) store this partition decision internally in a form that is useful for processing described below,
(2) change the model so that it reflects the partitioning decision, keep a record of these changes, and
(3) display the new state of the model, such that again it becomes obvious to the user where to look for more partition options.

The invention further provides for a computer program product comprising executable code for causing a processor to execute the method of any of the aforementioned aspects of the invention. Such executable code can be loaded onto a programmable system, causing the system to execute any of these methods.

Using the invention computer program products can be produced that can be loaded onto embedded system that provide a parallellized hardware and software implementation of the original computer program, which parallellized implementation satisfies one or more criteria regarding hardware constraints of the embedded system.

BRIEF DESCRIPTION OF THE FIGURES

The invention will now be described in more detail in conjunction with the figures, in which.

In the figures, same reference numbers indicate same or similar features.

DETAILED DESCRIPTION OF CERTAIN EMBODIMENTS

Introduction to Embedded Systems

Figure 1:
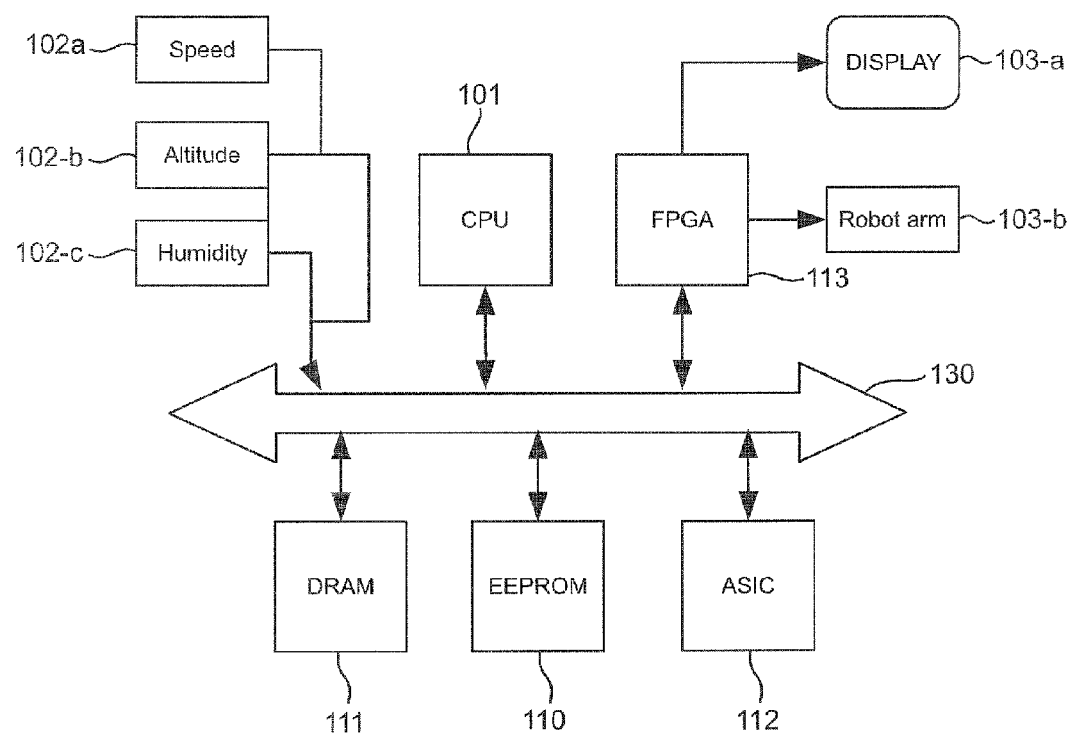
FIG. 1 schematically shows an example embedded system.

FIG. 1 schematically shows an example embedded system. The system in FIG. 1 is used by way of example to show and explain common hardware, software and design constructs in embedded systems. It by no means limits the usefulness or scope of the invention: the invention can be used for any type of embedded system for any purpose. The system is built around one or more central processing units CPU 101. Many CPU architectures can be used in embedded systems. Popular choices are RISC and VLIW-based CPU architectures.

The CPU receives input from sensors 102-$a$, 102-$b$, 102-$c$, which may provide digital input that can be used directly, or analog input that needs to be converted using an AD converter. By way of example, three sensors are shown: sensor 102-$a$ to provide input on speed, sensor 102-$b$ to provide input on altitude and sensor 102-$c$ to provide input on humidity. The input is transformed into output signals that e.g. may control an actuator which controls a mechanical arm 103-$b$ or show human-readable output on a display screen 103-$a$. The display screen 103-$a$ may be provided with its own embedded system or processor to transform input signals into output. To facilitate communication between all the different components, a bus 130 is provided.

Embedded systems, as noted above, are made up of a combination of special-purpose hardware and/or software, designed to function optimally for a certain purpose. Embedded systems are, as the name suggests, embedded into larger products such as televisions, radios, mobile phones, DVD players and other consumer electronics, but also in other apparatus such as industrial robots, cars or airplanes.

The hardware used in a particular embedded system broadly falls into two categories: special-purpose chips and other hardware that provides specific functions ("accelerators") and more general-purpose chips that are capable of executing software that provides specific functionality. The embedded software, sometimes referred to as firmware, is shown here as stored in an EEPROM 110. Many other types of memory chips are available, for example read-only memories (ROM), programmable ROM (PROM), erasable programmable ROM (EPROM), flash memory and non-volatile random access memories (non-volatile RAM). A dynamic random access memory DRAM 111 is provided to permit temporary storage of data.

The embedded system shown in FIG. 1 includes the CPU 101 as a separate component but typically it is more cost-effective to integrate the CPU 101 in the FPGA 113 or ASIC 112, as this reduces the number of chips in the embedded system. The invention presented here is capable of creating embedded systems that include a multitude of CPUs and accelerators that are all operating concurrently.

The goal of embedded system design is to come up with an embedded system that provides the most optimal partitioning of functionality to processors. What is "optimal" depends on many factors, such as the maximum price for the unit, the available space in the device's encasing, desired operating speed, real-time requirements, safety regulations or availability of suitable hardware accelerators.

Designing embedded systems requires the use of specific tools, collectively often referred to as a tool chain. A tool chain is a collection of software tools which are used to develop (embedded) software, from the writing of code to the production of the final and building of the embedded software and/or hardware descriptions in e.g. VHDL. The tools in a tool chain typically include compiler front ends and back ends, linkers, libraries, debuggers, preprocessors and testing tools. The actual production of the hardware that corresponds to the generated hardware description, as well as the loading of the firmware or embedded software onto the hardware, is usually done elsewhere and is considered to be out of the scope of this document.

The design of embedded system starts with a functional specification or prototype of the intended functionality of the system. This specification is written in a high-level programming language such as C, C++ or Java. This permits testing and verification of the specification in a simulation or test bench. Subsequently this specification needs to be transformed from a high-level, sequential representation into a new, lower-level representation that takes the concurrency and other aspects of the embedded system into account. This has the advantage that the tested and verified specification is transformed in a predictable way, which ensures (to the extent possible) that the resulting lower-level representation will conform to the same requirements as the high-level specification.

The invention provides for an automated or partially-automated transformation of a functional specification into a hardware-level representation and consequently into a complete design of an embedded system which has an improved partitioning of functionality to processors. Such improvements may be found in reduced costs or circuit board space, faster operating or response time or a better choice for specific hardware components.

Introduction to the Invention

Figure 2:
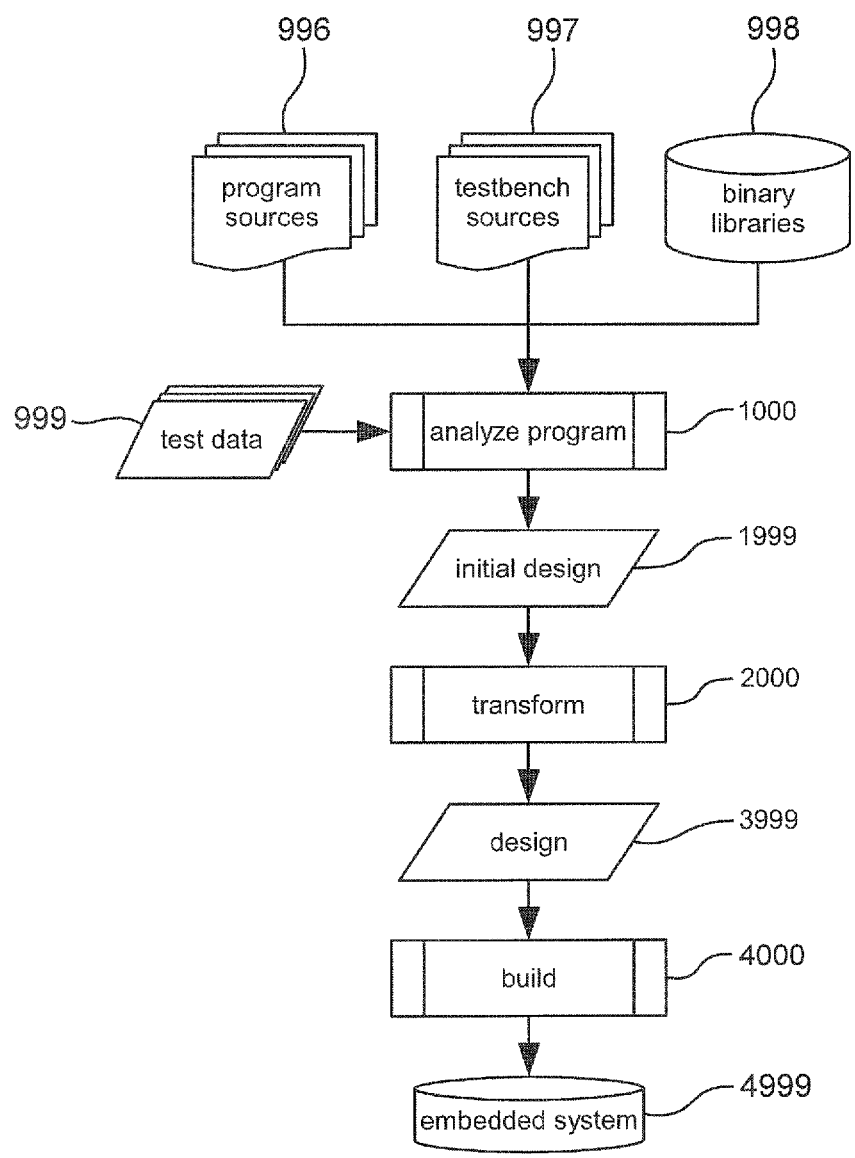
FIG. 2 schematically shows a high-level flowchart of the functionality provided by the invention.

FIG. 2 schematically shows a high-level flowchart of the functionality provided by the invention. Below, this functionality is referred to as a tool chain. Parts of this tool chain may be based on generally available tool chains such as the open source GNU Compiler Collection (gcc) tool chain whose frontend provides useful functionality in the compilation process 1100. For the sake of clarity, the tool's functionality is described by reference to the steps undertaken by a programmer using the tool. The tool implements three steps: analysis 1000, transformation 2000 and build 4000, which will be elaborated upon below. Generally speaking, user-provided program sources 996, testbench sources 997 and libraries 998 are transformed and processed in various ways so as to obtain an embedded system 4999 It is assumed that a programmer has previously prepared the functional specification in the high-level programming language as above.

In the analysis step 1000, the program source 996 is subjected to static and dynamic program analysis to obtain structural and behavioral program models. These models are used in the transformation step 2000 to derive a design 3999, or a number of so-called design alternatives that satisfy the design criteria. In the build step 4000 the selected design is mapped to a combination of software and hardware that represents the desired embedded system 4999. These steps are discussed below in more detail. A more extensive treatment of these steps and various advantageous embodiments and improvements thereto may be found in international patent application WO 2010/140883, claiming priority of co-pending Dutch patent applications N2002951 of 2 Jun. 2009 and N2004078 of 8 Jan. 2010, all incorporated herein by reference.

Program Analysis Process

Figure 3:
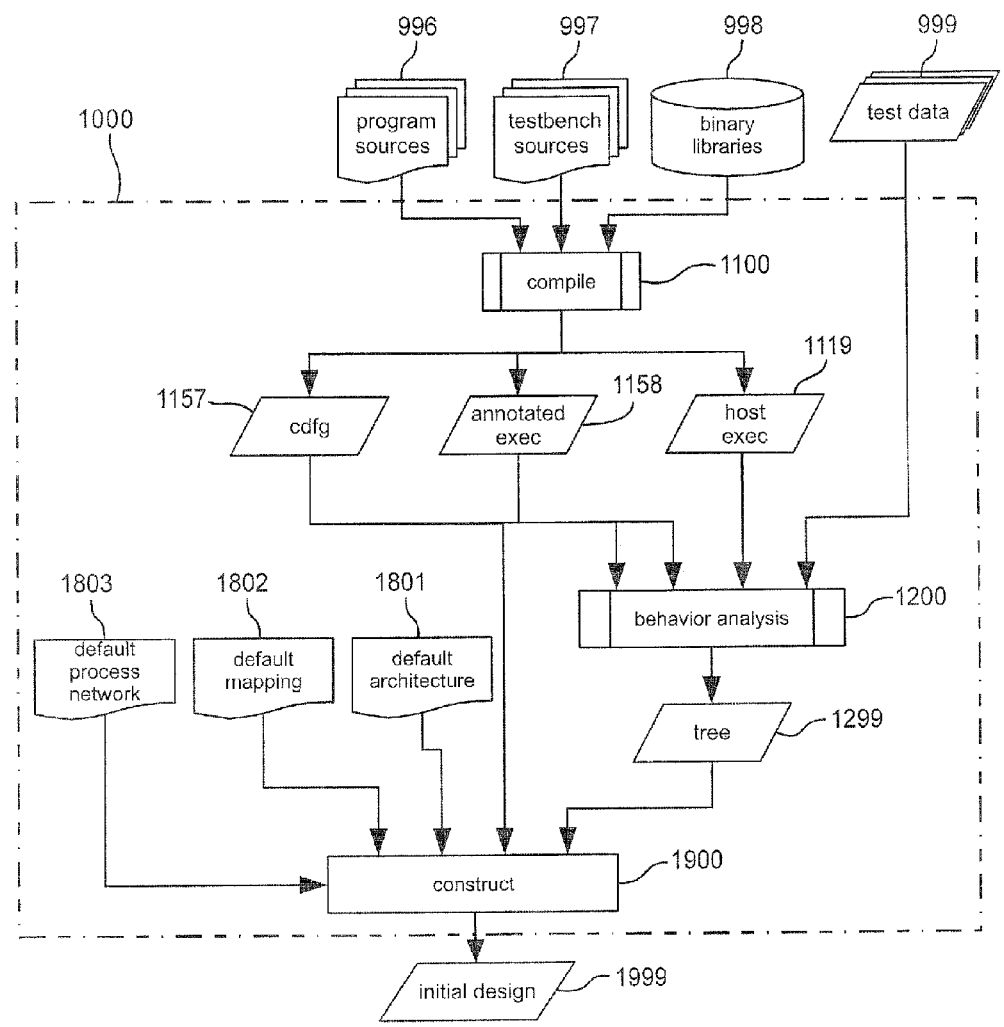
FIG. 3 shows a preferred embodiment of the program analysis process.
Figure 5:
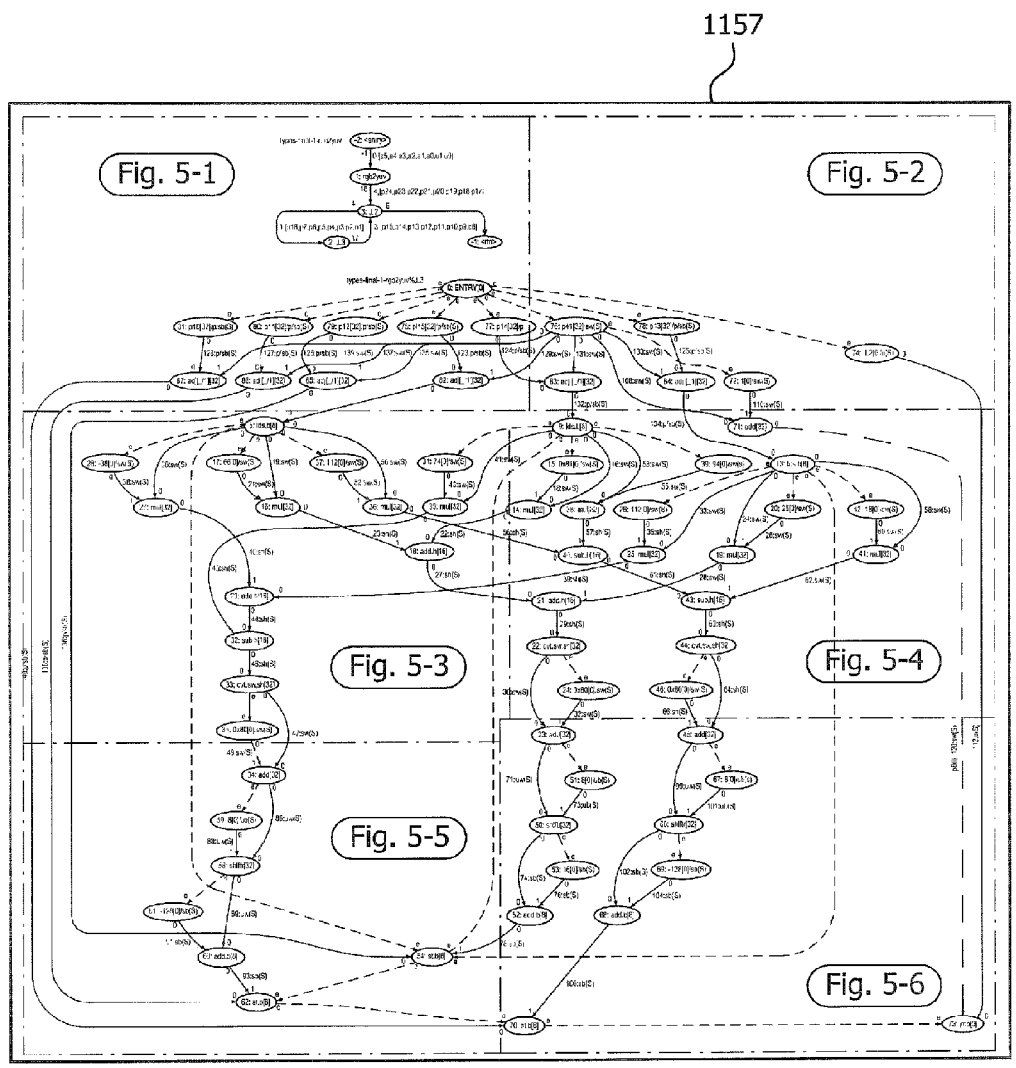
FIG. 5 shows an exemplary sample control-dataflow graph corresponding to the sample program source of FIG. 4.
Figures 1, 5:
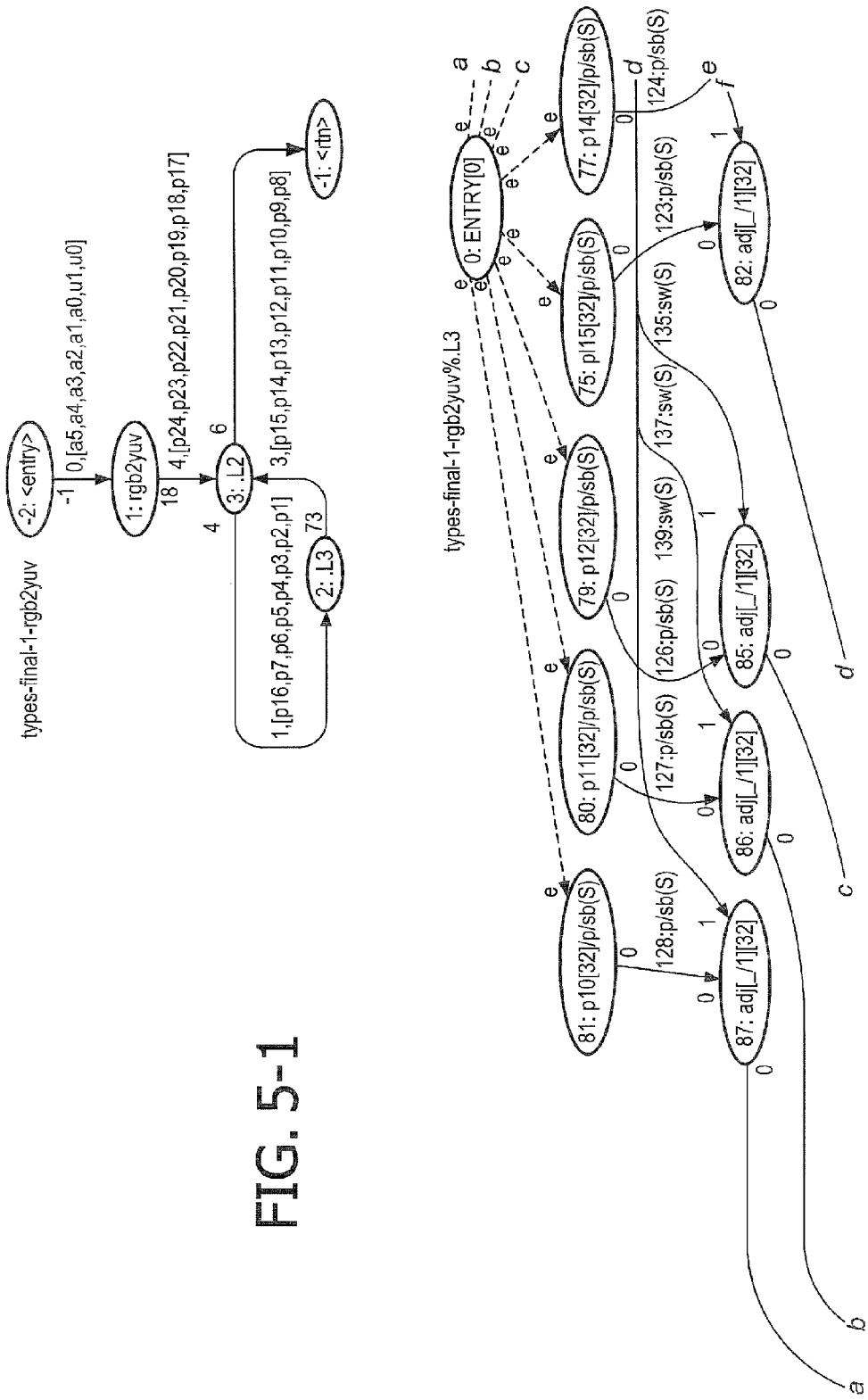
Figures 2, 5:
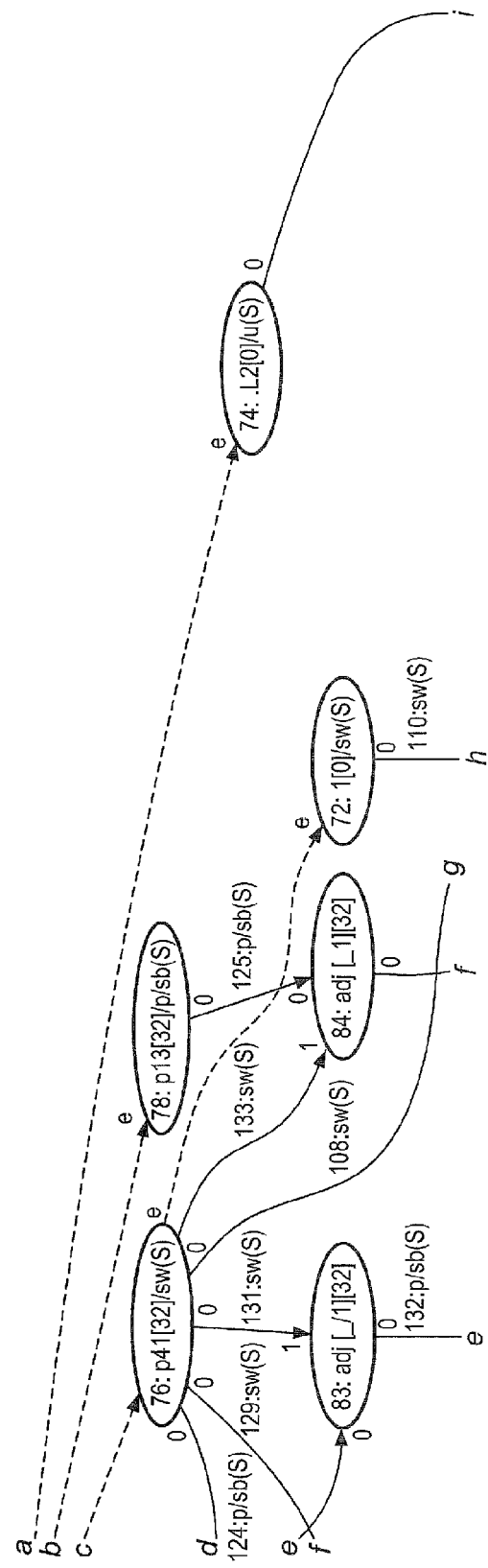
Figures 3, 5:
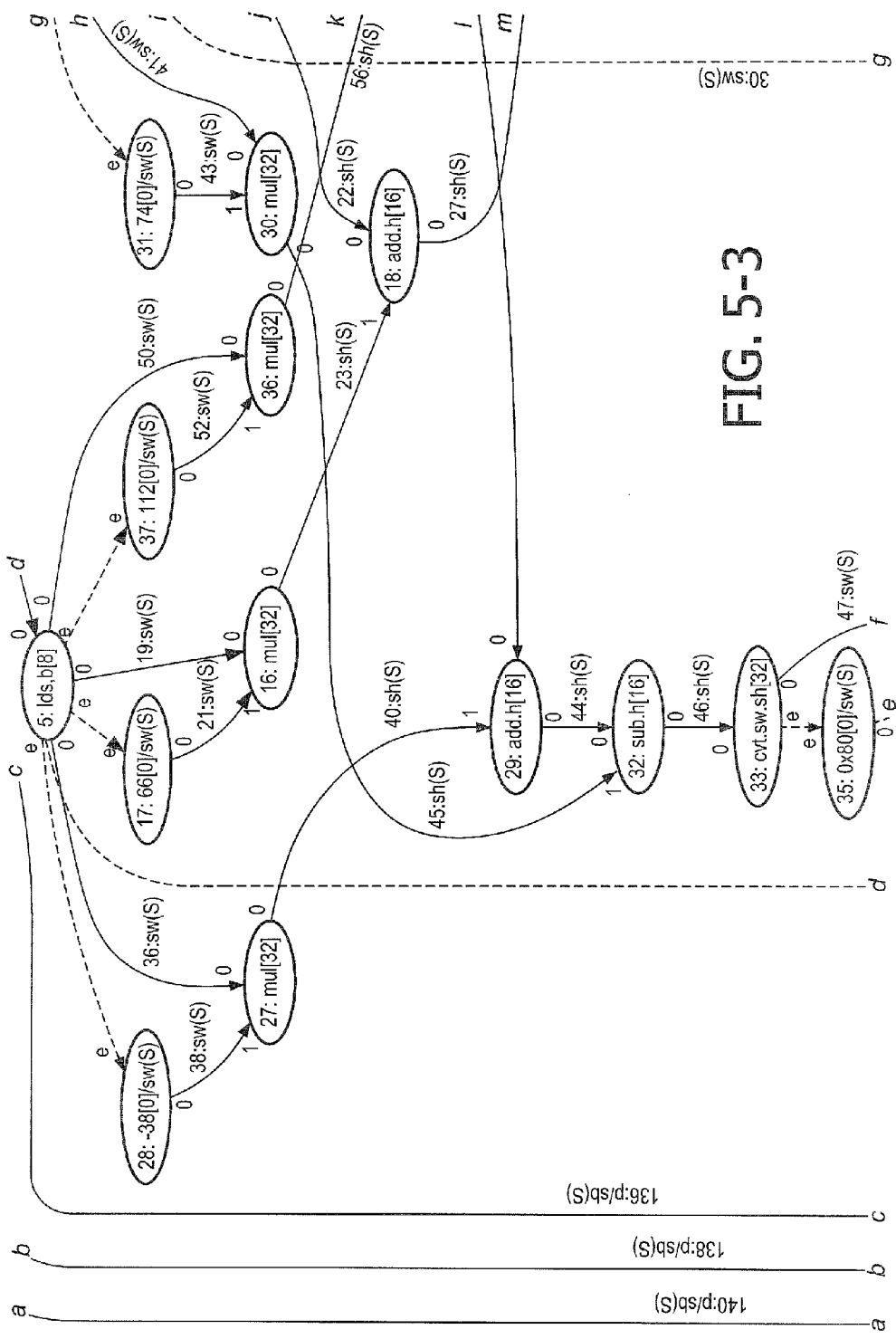
Figures 4, 5:
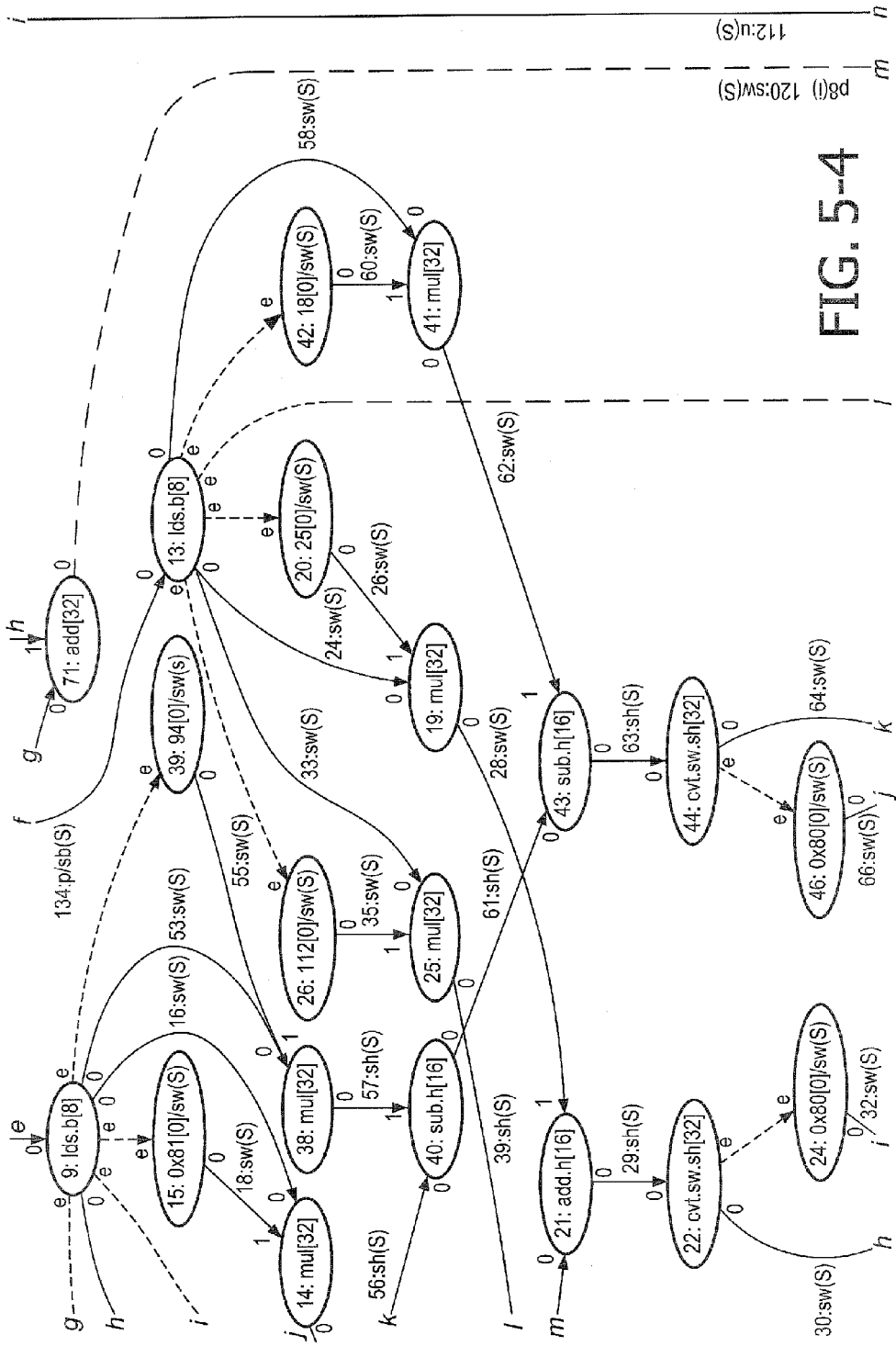
FIG. 4 shows a sample program source and test bench source.
Figure 5:
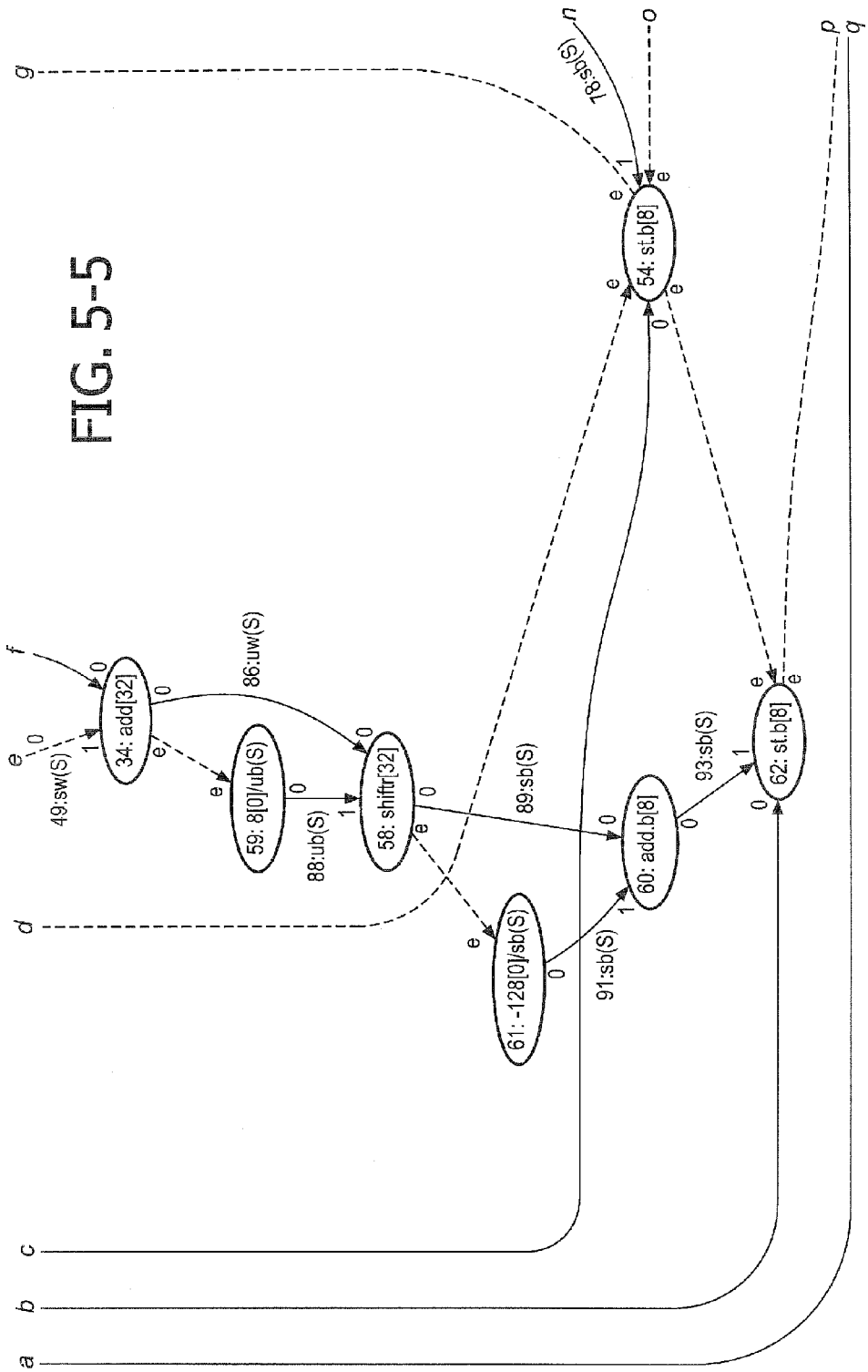

FIG. 3 shows a preferred embodiment of the program analysis process 1000 according to the present invention. In this process, the program sources 996, test bench sources 997 and libraries 998 are compiled 1100 and combined with test data 999 to produce the initial design 1999. This initial design 1999 will be used as a starting point for transformation process 2000 which produces the design 3999 or the multiple design alternatives. For illustrative purposes FIG. 4 shows a sample program source 996 and test bench source 997. These sources are written in the C language, but any other high-level programming language may be used as well.

Figures 5, 6:
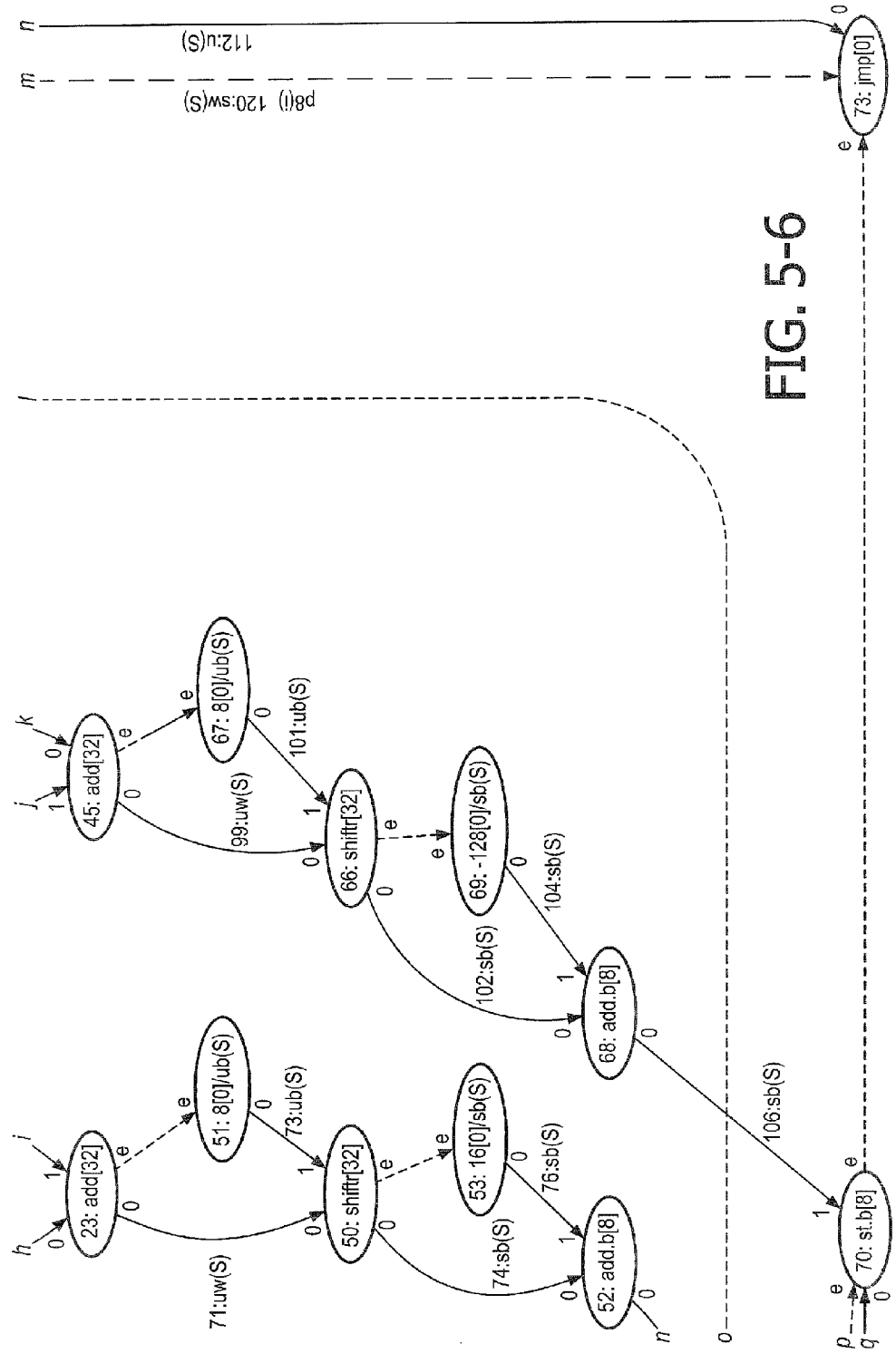
FIG. 6 shows an exemplary sample annotated executable corresponding to the sample program source of FIG. 4.
Figure 6:
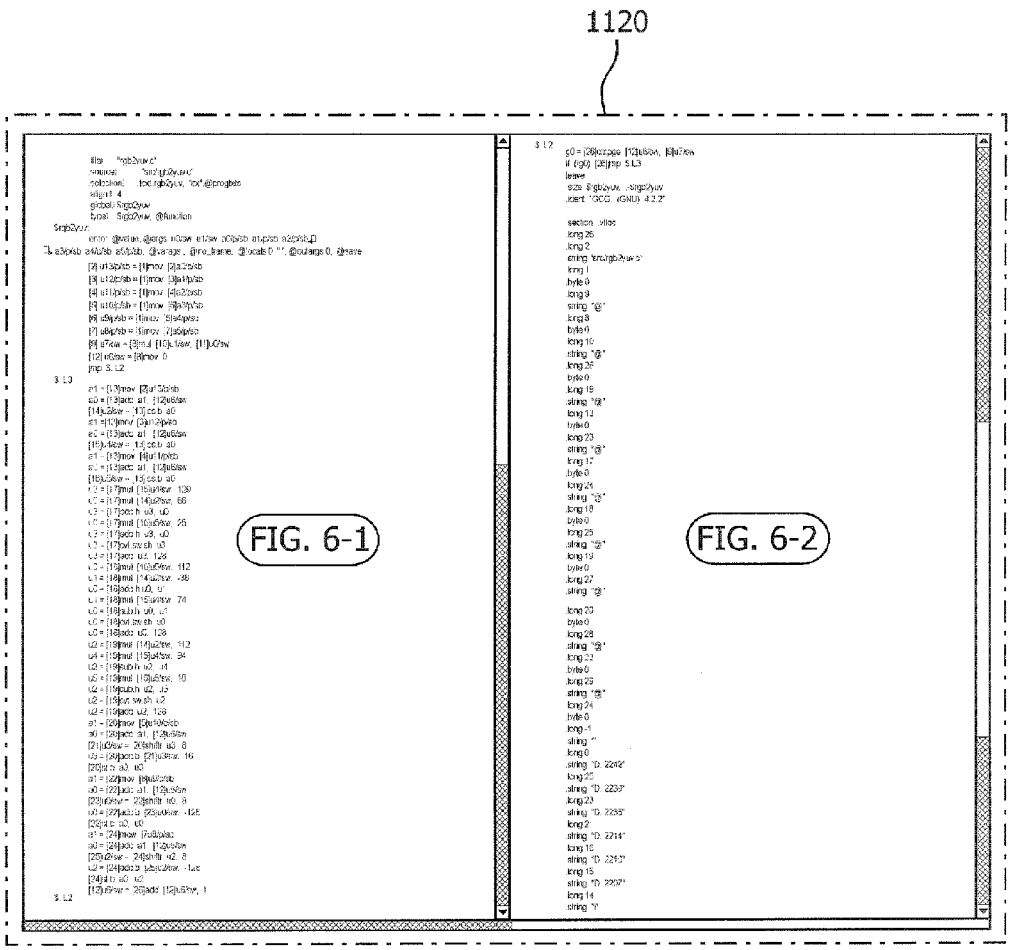

The compilation step 1100 translates the user-provided program sources 996 and test bench sources 997, then links it with the libraries 998. The result of the compilation step 1100 is divided in three parts. A control-dataflow graph 1157 (abbreviated CDFG) captures the static structure of the program 996. An exemplary sample CDFG 1157 corresponding to the sample program source 996 of FIG. 4 is shown in FIG. 5. The annotated executable 1158 is an executable program based on a particular instruction set, such as the well-known x86 instruction set, in which every instruction can be annotated with information that links the instruction back to a specific part of the CDFG 1157. An exemplary sample annotated executable corresponding to the sample program source 996 of FIG. 4 is shown in FIG. 6. The host executable 1199 is an executable image that can run on the host computer; it contains the compiled test bench 997 and libraries 998 and a reference to the annotated executable 1158. Some parts or all of the libraries 998 may also be linked dynamically with the host executable 1199.

The analysis step 1200 uses the CDFG 1157, annotated executable 1158 and host executable 1199 to capture the behavior of the program 996 into a data structure that is called a behavioral model 1299. To do so effectively the analyzer 1200 requires test data 999. It is important that the test data 999 exhibits a good coverage of the program 996. This means that the test data 999 causes the annotated executable to execute all important instructions of the program source 996 in ways that are representative for the normal behavior of the program 996.

There are two ways to construct the tree 1299, a static and a dynamic way. These two ways are preferably both used to obtain the best analysis of the behavior of the program 996.

The static way is to derive a tree from the static CDFG structure 1157 of the program 996. This occurs in the read static 1230 step. Static tree 1239 extracted in this step is mainly limited to function invocation patterns. For example, the static tree 1239 may contain information that function "foo" calls function "bar" in two different places, and that it calls "printf" in one place.

The dynamic way to derive a tree is to execute 1210 the annotated executable 1158 and test bench 997 on a host processor. Step 1210 is discussed in more detail below. Briefly, the host processor calls an instruction interpreter to execute the annotated executable 1158. The instruction interpreter inserts tokens that represent events that occur during the execution of annotated executable 1158 and test bench 997 with test data 999.

The behavioral model 1299 represents the dynamic behavior of program 996 when test data 999 is applied. In accordance with a first aspect of the present invention, certain information regarding load/store instructions is collected this analysis step 1000 into the behavioral model 1299. Preferably this information comprises at least some of the following:

Run time of every function invocation

Run time of every loop body invocation

Number of times each loop body is executed

Memory dependencies: when a store instruction writes a value to memory and a load instruction later reads that value from the same memory location, then a data or memory dependency exists between said store and load instruction. It is also possible that multiple store instructions communicate with multiple load instructions. The memory dependencies can be annotated with bandwidth numbers that refer to the amount of bytes moved from the store instructions to the load instructions.

Streaming dependencies: this is like a memory dependency, but this time a special memory access pattern is detected during the run. The pattern is special because it enables a program transformation where a store instructions located in one task of a parallel program and the corresponding load instruction is located in another task of the parallel program and the memory location through which the store and load instructions communicate is replaced by a communication channel.

For the first aspect of the invention it is important to collect at least the memory and streaming dependencies in any case. Other information items are useful to visualize to a user where any performance bottlenecks may be.

After the behavioral model 1299 and the CDFG 1157 have been computed, initial design construction step 1900 constructs the initial design 1999.

Transform Process

Figure 7:
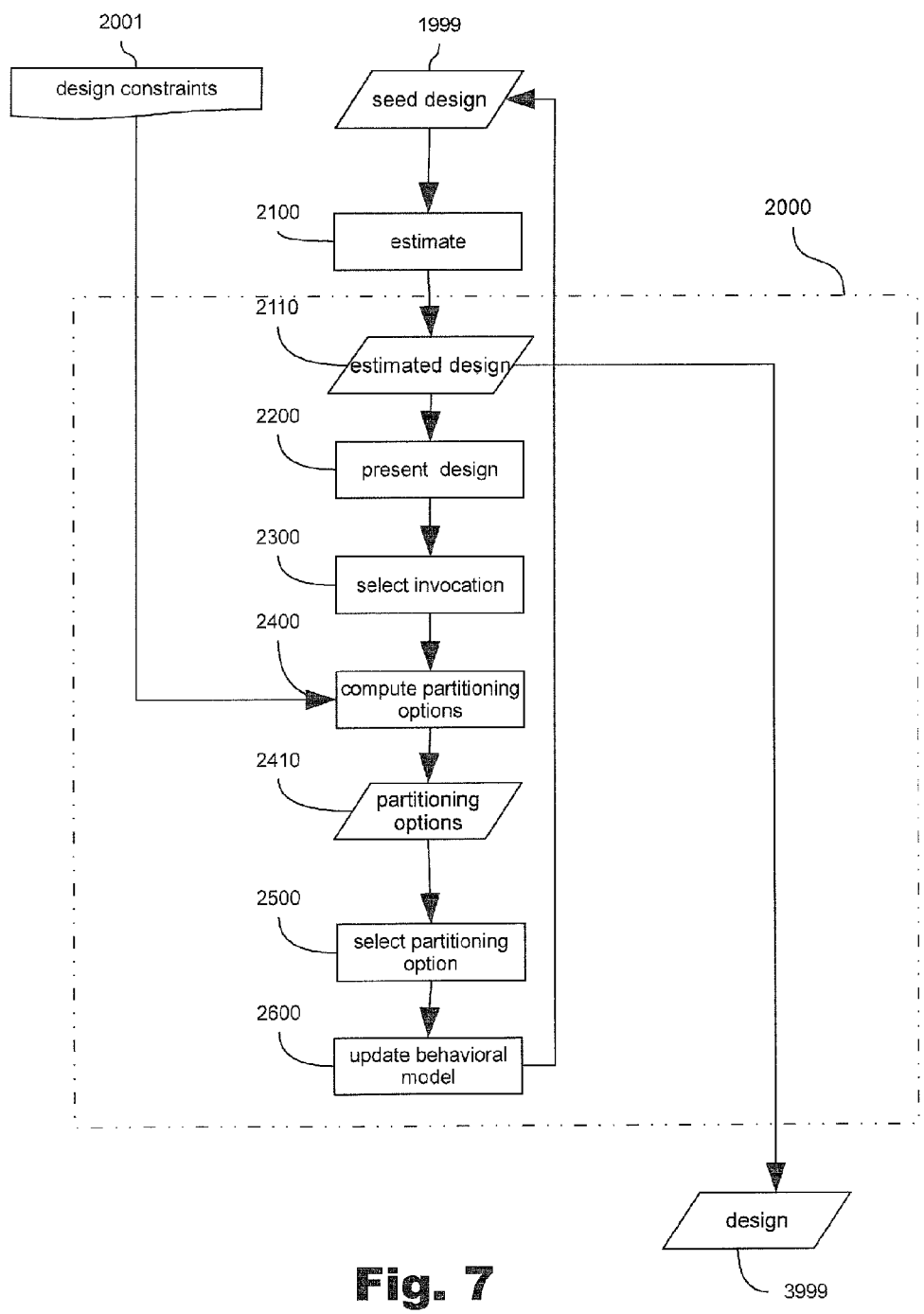
FIG. 7 shows a preferred embodiment of the design transformation process.

FIG. 7 shows a preferred embodiment of the design transformation process 2000 according to the invention. The design transformation process 2000 transforms the initial design 1999 as produced by the analysis step 1000 into the design 3999. Alternatively one may transform the initial design 1999 into multiple design alternatives, each with different area and delay trade-offs. These alternatives are then offered to a user for selection of a preferred design that will be used as design 3999. Each design alternative contains a variation of the initial program 996 that takes particular area and delay trade-offs into account.

An estimator 2100 estimates various characteristics of the seed design 1999 for a given target architecture. For the sake of brevity, a design together with the estimates of these characteristics is referred to hereafter as an estimated design 2110. The remainder of this document refers only to area and delay as characteristics or optimization targets of a design. However, the described method can be applied for other design characteristics, such as power consumption, incurred license fees for required hardware, or effort involved in manual code modifications.

The estimator 2100 examines all processes in the process network 1803 of a design and estimates the area and/or delay of each process individually. Area and/or delay of a single process is estimated by traversing all nodes in the behavioral model 1299 of that process and adding the estimates for each node. The estimate of area and/or delay of a behavioral model component is computed differently for the different target architecture components. The estimator 2100 uses the CDFG 1157 and the execution counts of loop bodies and instructions in the behavioral model 1299 to estimate the delay of each behavioral model component.

In an alternative embodiment, the estimator 2100 is implemented by measuring the above characteristics from the execution of a virtual emulation platform that is generated from the design's CDFG 1157. An example is the execution of a SystemC model that may include data cache models and instruction-set simulators to obtain a cycle-accurate performance measurement.

The transform process partitions a seed design 1999 by separating functionality from the original program 996 and assigning these to parallel tasks, i.e. tasks to be performed on separate processors. In a first embodiment of the transform process, user input is used to realize the partitioning. In this embodiment a graphical user interface displays 2200 the program structure with associated dependencies giving the user the required insight in the application behavior needed to select 2300 a bottleneck function or loop invocation. In such embodiments step 2400 then implements displaying a number of partitioning options 2410, allowing the user to select a preferred partitioning option 2500 for further partitioning of other function or loop invocations. Each preferred partitioning option results in an updated and re-estimated design 2110 that can be used as the design 3999 or, if multiple design alternatives are generated, stored as one design alternative.

Figure 8:
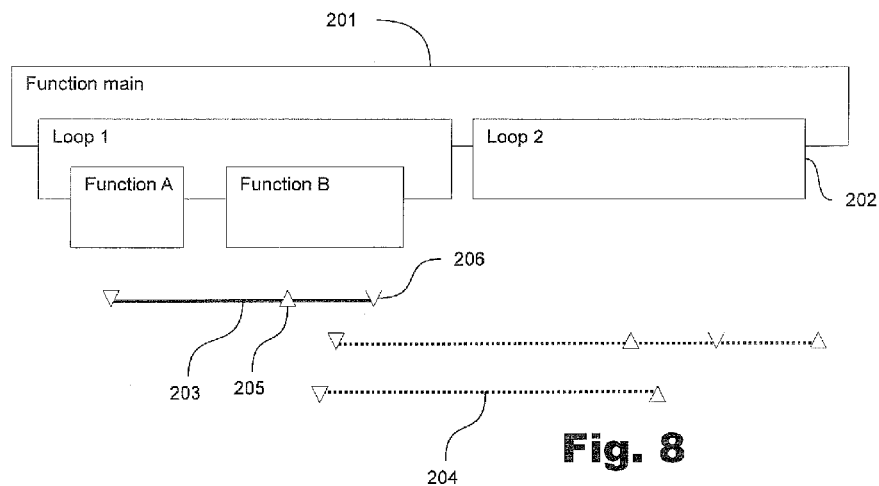
FIG. 8 shows an example embodiment of a graphical user interface that presents a behavioral model to the user.

In such embodiments partitioning happens interactively but it is important to keep in mind that partitioning happens on the behavioral model and not on the original program 996 itself. FIG. 8 shows an example embodiment of a user interface that presents the behavioral model to the user. The boxes 201 represent a function and box 202 represents a loop. These boxes are further referred to as invocations. It is important to note that the hierarchy of invocations as presented in FIG. 8 closely represents the logical structure of the original program. The data dependencies 203 are shown as straight horizontal lines in FIG. 8, and the streaming dependencies 204 are shown as dotted horizontal lines in FIG. 8. The load and store instructions that are the cause of the data dependencies and the stream dependencies are represented as small triangles on the dependency lines. A downward pointing triangle 206 represents a store instruction and an upward pointing triangle 205 represents a load instruction. The horizontal position of the triangles matches the approximate position of the load/store instruction in the invocation directly above it. For example, the load instruction 205 occurs inside Function B at about 30% of the function code length, and the store instruction 206 occurs in that same Function B at almost the end of the function code.

The width of invocations as shown in these figures corresponds to their execution delay: wider invocations take longer to execute. Therefore, wide invocations are attractive candidates for parallelization through partitioning. This preferred way of representing invocations provides a visually attractive way of assessing the behavior of the program and identifying candidates for parallelization.

It is important to ensure that a partitioning choice is correct. In accordance with a second aspect of the invention, the semantics of the original program 996 is preserved by the partitioned program using the following two rules:

A memory dependency cannot cross a partitioning boundary. In other words, all the load and store instructions that form a memory dependency must be part of the same task.

A streaming dependency can cross a task boundary as long as all store instructions execute in one active task and all load instructions execute in another active task. More load and store instructions of this stream can be located in a third task (and a fourth, fifth, . . . ) as long as the partitioning guarantees that these third, fourth, . . . tasks are suspended (i.e. non-active) while the first and second task are active.

Figure 9:
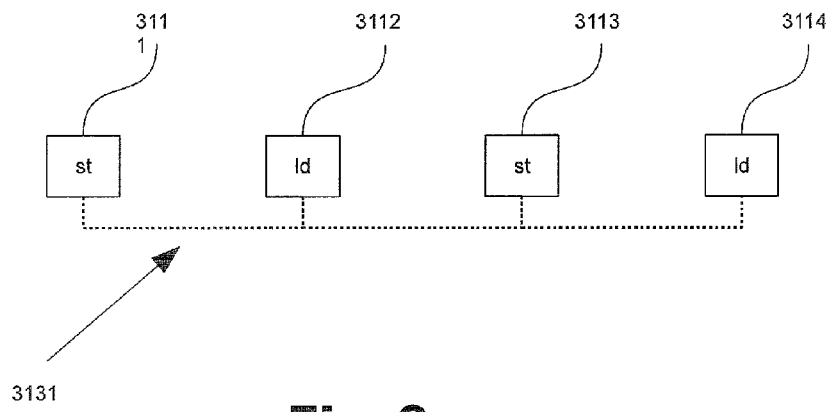
FIG. 9 shows an example streaming dependency involving of two store instructions and two load instructions.

FIG. 9 shows an example streaming dependency 3131 involving two store instructions 3111 and 3113 and two load instructions 3112 and 3114. The figure shows a special memory access pattern, namely a sequence of alternating store and load instructions. In this example we assume that load 3112 and store 3113 are part of the same inner loop, and load 11 and store 14 are outside that loop.

Figure 10:
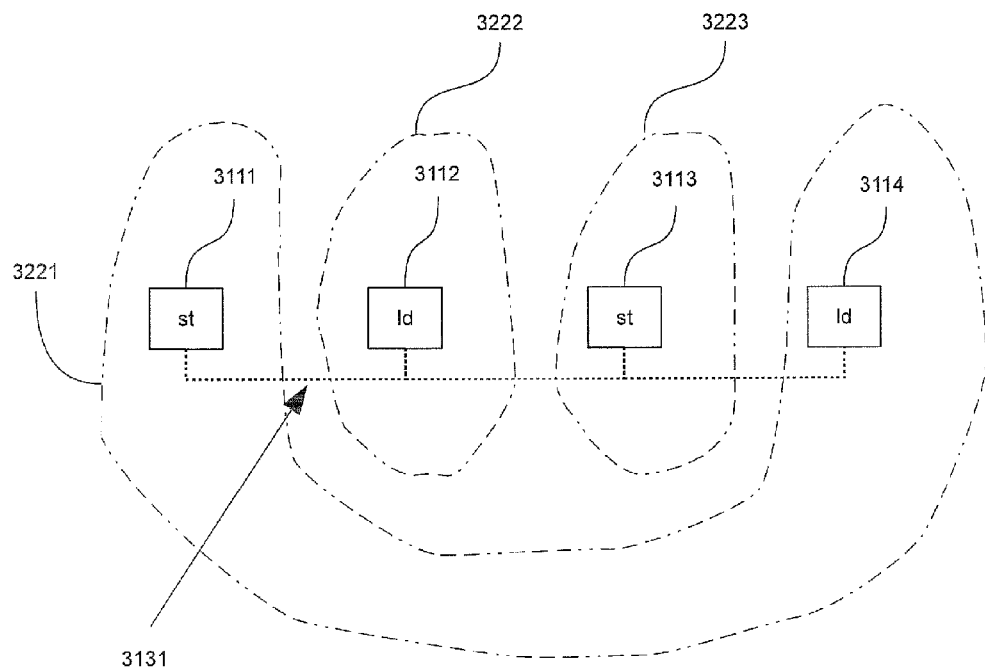
FIG. 10 shows a possible partitioning regarding this streaming dependency where an inner loop is distributed over two tasks.

FIG. 10 shows a possible partitioning involving streaming dependency 3131 where the inner loop is distributed over two tasks 3222 and 3223. With this partitioning a run-time mechanism must ensure that task 3221 is suspended while task 3222 and task 3223 execute the inner loop. In this partitioning, the store instructions 3111, 3113 are all in different tasks from the corresponding load instructions 3112, 3114. In the partitioning of FIG. 10, store instruction 3111 happens to be in the same task 3221 as load instruction 3114 but as these two instructions are not corresponding to each other, this partitioning is correct.

Preferably similar rules are implemented to address other types of dependency patterns. For example, one dependency pattern may refer to memory access under the protection of a synchronization variable called mutex. Said pattern can always cross a task boundary.

In the GUI, the block to be partitioned may e.g. be selected with a mouse or be chosen from a list where blocks are shown in decreasing order of width. In response to such selection, the user is presented with a list of partitioning options consistent with the rules for crossing dependencies outlined above. Preferably each entry in the list contains the speedup and the cost of the partitioning option. Said costs may include synchronization overhead, bandwidth requirements, number of memory channels needed, lines of source code required to implement this partitioning, and so on.

Preferably a preview is provided for each partitioning option. Such preview is intended to provide a graphical clue of the partitioning, for example by drawing vertical lines through the invocations on the places where parallel tasks would be separated from the main program.

After receiving a user selection of a partitioning option, the results of that partitioning option are calculated and a new behavioral model with the option incorporated into it is obtained, including the new execution delay of the parallel program that corresponds to the partitioned model. The overhead of the partitioning (due to extra synchronization instructions that were not there before, and also due to replacing memory instruction with channel i/o operations) is preferably also included in this number. Further optionally included in the results are effects on bandwidth and on the memory use of the partitioned program, and the cost that this partitioning adds to the total implementation cost of the program.

The GUI then shows the changed behavior of the model by redrawing all invocations such that their new width reflects the execution delay of the program after the partitioning is effectuated. Preferably the partitioned invocation is marked, for example with a label, allowing the user to review the list of partitioning options and possibly select an alternative partitioning option from the list.

The user may repeat the above until the desired level of performance improvement is achieved at an acceptable cost level. In some cases, a partitioning option may negatively affect performance. It is thus preferable to allow the user to undo each selection of a partitioning option.

In a preferred embodiment the GUI is configured to display the global impact of the current program partitioning. This impact is expressed as the aggregate performance, e.g. speed or cost, of all the selected partitioning options. This "score board" keeps the user informed about how close he is to his partitioning goals.

At times the partitioning tool may not be able to display good partitioning options because a dependency prevents a favorable creation of tasks. In such cases the user can inspect the dependency display as shown in FIG. 8 to see if any source code changes in the original program 996 can solve the problem. For example, by rewriting parts of the original program 996 a memory dependency can sometimes be changed into a streaming dependency or another dependency that allows partitioning. To this end, the partitioning tool should preferably provide cross-probing functionality to show the source code associated with a displayed invocation.

In a second embodiment of the transform process, partitioning is performed in a more automated way. A preferred embodiment operates as follows. The user points to an invocation that he deems critical for an efficient implementation. An algorithm then elaborates a promising set of legal partitions for this invocation. To keep things computationally tractable, the algorithm only explores a reasonable subset of all possibilities, for example by limiting itself to inspecting only the invocation and its immediate sub-invocations for partitioning options, or by limiting the amount of compute time it spends on the search, or through a combination of these two. When considering a candidate partition, the algorithm rejects any candidate partition that violates the two rules outlined above.

One may also completely eliminate the involvement of a human operator but that would introduce a risk that a suboptimal partitioning is chosen. The choice of partitioning option can be made in an automated fashion by examining for each option the associated performance increase, for example by choosing each time the option with best performance increase until the performance matches a predetermined, e.g. user-configured, criterion such as the speed being above a certain limit or the cost being below a certain amount.

As partitioning options and their performance impact may influence the availability and impact of further partitioning options, a choice that may provide a large positive impact by itself can foreclose later choices that turn out to have an even greater positive impact. One may wish employ one of the many algorithms available for optimal path selection to address this issue.

Once the partitioning has been completed, the process of generating the embedded system moves to the next step, the building process 4000. If plural design alternatives have been generated, now first a selection step 3000 is necessary before the build process 4000 can be initiated. In this selection step 3000 the design alternatives are presented for comparison to allow for user selection of the final design 3999. This allows for exploration of hardware/software combinations along various criteria.

Build Process

Figure 11:
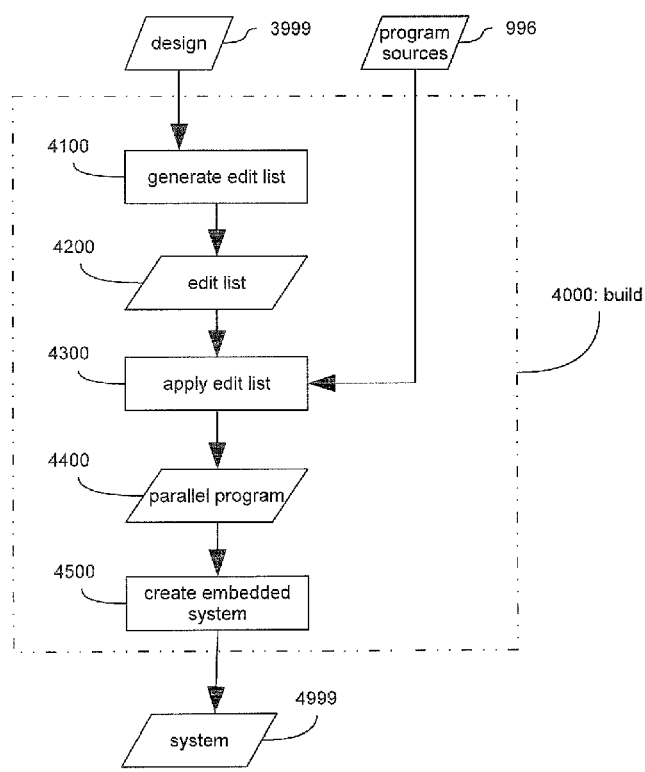
FIG. 11 shows a preferred embodiment of the build process.

FIG. 11 shows a preferred embodiment of the build process 4000 according to the invention. The build process 4000 creates the target-specific system implementation 4999 from the more abstract input design specification 3999. This implementation comprises a plurality of parallel processes that execute in software and/or hardware.

The generate step 4100 derives a list of items from the behavioral model of the design 3999, where each item implements one or more transformations from the transform step 2000. Applying 4300 the list to the original source code 996 results in a parallel program 4400 that for instance contains fork and join calls to create parallel tasks, and stream read and write calls to implement streaming communication.

In addition, the parallel program may contain statements to map variables to special memory blocks and mapping channel ports in the application to processor interfaces (physical ports). Some useful implementation aspects are the following:

Mapping of variables (or datastructures), such as found in the original program sources 996, into specific memory blocks which may appear in distributed form in the system architecture.

Creating a mapping for process ports that read/write to channels, to the physical ports that identify globally unique channel ports.

The mapping of variables into specific memory blocks is directed by different types of information, such as size of the variable in memory footprint, available space in the memory blocks, required bandwidth for accessing the variable, available bandwidth for the memory block, distance between the memory block and the processor(s) that access the variable.

In step 4500, the parallel program 4400 is further transformed to create an embedded system 4999 as known from standard embedded system design methodologies. This involves for example creating an executable from the parallel program 4400 to execute on an embedded programmable processor or DSP, and/or manual or semi-automated translation to dedicated hardware accelerators.

While one may translate the list of items from the behavior model directly into object code, in accordance with a third aspect of the invention the design 3999 is processed to identify a series of changes to be made to the original program source code 996. Preferably this editing step generates and applies changes to the original program sources 996 to construct the parallel program corresponding to the record of the partitioning decisions from the partitioning phase. This way a user can make manual improvements to the source code that is the result of the partitioning. The generated changes further provide a clear overview of the changes that result from this partitioning. Alternatively the list can be translated into new source code by a process of reverse compiling or mapping the list into source code items that are functionally equivalent to the original program 996. This also provides a user the option to review & manually alter the source code of program as partitioned earlier but does not give him the aforementioned overview.

In accordance with this third aspect of the invention the records of partitioning decisions are retrieved and processed to produce detailed source code edit steps that correspond one-to-one with the partition decisions that were applied to the behavioral model. This is possible thanks to the information regarding load/store instructions that was collected during analysis step 1000 into the behavioral model 1299. The invention can do this because the model contains very detailed information about the origin of each program instruction. In other words, the model knows exactly which lines from the source code of original program 996 correspond to each part of the model and therefore it can translate the partitioning steps conducted on the model to their corresponding source code edit steps.

Typically, a partition decision translates to source code changes on various points in the source code. In some source code locations a call must be inserted to create a task (sometimes called thread), in other source code locations a call must be inserted to join' this thread. And in yet other source code locations calls must be inserted to change a normal load or store operation to a channel read or write operation, and in yet other source code locations synchronization calls must be inserted as part of the channel communication protocol.

The editing instructions needed to effectuate said source code changes are derived directly from the partition records. Each such record contains in all required detail a partition decision, that is, a list of program instructions around which a partition boundary must be created, and a list of all load and store instructions that must be changed to channel read or write operations. As the model also carries with each such instruction a reference to the location in the source code of original program 996 that caused said instruction to be generated during initial compilation of the original program 996, it is possible to translate said partition records to detailed editing instructions that directly refer to the source code of the original program.

As stated in the introduction, converting a sequential program to an equivalent parallel program is a specialists job, and this inherent complexity is exposed during the edit process. However, in accordance with this third aspect of the invention the user does not have to understand what is happening to the program in the edit phase, as long as the edit instructions are all executed correctly. Executing the edit instructions is a simple one by one process. Several ways can be thought of to execute the list of editing instructions. To name a few:

The editing instructions can be executed manually by an operator. An example of one such an edit instructions is: "In file 'fast_idct.c', line 108, insert the text 'stream_write(chan5, var10);' at the beginning of the line". It can be seen from this example that the user who executes a list of such instructions does not need to understand anything about parallel programming.

The editing instructions can be executed by a refactoring tool. An example of a refactoring tool is the one that comes built-in to the well-known editor Eclipse (see www.eclipse.org). In this embodiment, the partitioning tool outputs the list of editing instructions in a format that is recognized by the refactoring tool. The refactoring tool executes the editing step either fully automatically, or it executes them step by step, showing the intermediate result to the user and possibly showing a message that explains the user what it is doing. The latter may be interesting because the user would usually want to take ownership of the resulting parallel program, so the user may want the be informed about the workings of the parallel program.

The editing instructions can be executed by a batch editor, for example the standard Unix sed program. In this case the partitioning decisions are output as a list of editing instructions in the form of a sed script and then invokes sed to effectuate the editing instructions. Other scripts or batch tools may also be used of course.

A particular problem arises when the original program performs an address computation and uses this computed address to store a data item. If this store instruction is later changed into a stream write operation by the editing process described above, the question remains to which address in the communication channel buffer said data item must be written. In general this is a hard problem to solve but without a solution most of the communication channel insertion would result in a faulty embedded system.

In an embodiment a mechanism is provided that enables edit steps that insert the channel i/o call to be performed without requiring additional edit steps to change the address computation. This works as follows. The stream pattern detector not only detects which load and store instructions are part of the same stream, but it also detects essential parameters of the stream. These parameters include—but are not limited to—the size of the buffer that is passed from producer task to consumer task at every synchronization point. In many cases this buffer has a size that larger than a single data word, and therefore writing and reading the buffer requires an offset inside the buffer. For example, if the buffer has a size of 192 bytes then the write and read operations must use include a number in the range [0 . . . 191] to indicate the offset inside the buffer.

To solve the problem of re-mapping the original address used by the program to an offset in the buffer first we observe that in fact it does not matter which offset is used, as long as writer and reader side use the same offset for the same data item. Using this observation we can apply a function F to the original address aa such that any address range [aa . . . aa+size−1] is mapped bijectively on the offset range [0 . . . size−1]. In this formula size represents any number that is at least the size of the required buffer as detected by the stream pattern detector.

In one embodiment, the function F can be the modulo(size) operation. However, in the general case where we have no knowledge about the potential alignment and size of individual load and store operations, a tradeoff between memory-use and the time required to compute F can be made if size is taken to be at least as big as the buffer size plus the largest possible data item that can be copied into the buffer. In this way, the stream i/o function does not have to compute the offset for every individual byte of the data item, but it can safely assume that the data item can be copied to/from the buffer using only the offset of the initial byte.

In another embodiment the implemented buffer size is increased to a suitable power of two (in our example of size=192, 256 would be a likely buffer size candidate) and then simple bit masking can be used as the function F. For example, if the buffer is increased to 256 bytes (as in the example) then the function bitwise_and(aa,0xff) would be an efficient and correct implementation of F.

Closing Remarks

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention is preferably implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

What is claimed is:

1. A computer-implemented method of generating an embedded system (4999) comprising a parallelized hardware and/or software implementation of an original computer program (996), which parallelized implementation satisfies one or more criteria regarding hardware constraints of the embedded system (4999), the method comprising the steps of:

subjecting (1000) the original computer program (996) to static program analysis, comprising compiling the original computer program into an executable to obtain structural program models comprising control data flow graphs (1157) with static data dependencies and static data types, and to dynamic program analysis, comprising executing the executable on a host computer using test data, capturing the interactions with the memory of the host computer during the executing of the executable to identify sets of load and store operations of the original computer program that access the same memory locations as dynamic data dependencies, and capturing execution counts of code sections, to obtain behavioral program models, deriving (2000) a preferred design (3999) that satisfies the one or more criteria regarding hardware constraints using the obtained structural and behavioral program models, and building (4000) the embedded system (4999) by transforming the design (3999) to a parallelized implementation that comprises a plurality of parallel processes that execute in software and/or hardware, characterized in that the step of subjecting (1000) the original computer program to the static and the dynamic program analysis is performed on a version of the original computer program (996) in which load and store instructions are annotated with information that links these instructions back to a specific part of a control-dataflow graph (1157), the step of subjecting (1000) comprises adding to the structural and the behavioral program models indications of memory dependencies and indications of streaming dependencies, the step of deriving (2000) the design (3999) comprises using the structural and behavioral program models and providing information about mutually parallel implementation of each part of the preferred design (3999), which step comprises a) introducing a separation into different partitions of load and store instructions that have a detected streaming dependency between them, using the added indications of streaming dependencies from the models, b) introducing a separation into different partitions of load and store instructions that have a detected memory dependency with synchronization protection between them, using the added indications of memory dependencies from the models, c) retaining in a single partition load and store instructions that have another detected memory dependency between them, using the added indications of memory dependencies from the models, the step of deriving (2000) the design (3999) further comprising a step of adding to the structural and behavioral program models indications of source lines and variables in said original computer program to relate the introduced partitions and the detected dependencies in the program model with locations in the original program source code, and the step of building (4000) the embedded system (4999) comprising specifying the preferred design (3999) by means of a series of changes to be made to the original computer program (996) based at least in part on the added indications, applying the series of changes to the original computer program (996), and using the thus-changed original computer program (996) in the building of the embedded system (4999).

2. The computer-implemented method of claim 1, in which the step of subjecting (1000) comprises additionally adding to the structural and behavioral program models indications of at least the size of a buffer used for communication between tasks, and the step of building (4000) further comprises providing a function to bijectively map any address in a memory address range of a size corresponding to the size of the buffer to a virtual address range such that any address range [aa . . . aa+size−1] is mapped bijectively on the offset range [0 . . . size−1], where 'size' represents a number that is at least the size of the buffer.

3. The computer-implemented method of claim 1, in which the step of deriving (2000) derives a plurality of design alternatives that each satisfy the one or more criteria, and is followed by a step of selecting (3000) the preferred design (3999) from the plurality of design alternatives.

4. The computer-implemented method of claim 3, in which the step of selecting (3000) involves calculating an impact of at least one aspect of each of the design alternatives and selecting the preferred design as the one of the design alternatives whose impact best fits a predetermined criterion.

5. The computer-implemented method of claim 4, where the impact relates to the aspect of an estimated execution speed of each of the design alternatives.

6. The computer-implemented method of claim 1, in which the step of subjecting (1000) the original computer program (996) to static and dynamic program analysis comprises adding to the structural and behavioral program models at least one of: the run time of every function invocation, the run time of every loop body invocation, the number of times each loop body is executed.

7. The computer-implemented method of claim 6, in which the step of deriving (2000) involves presenting said structural and behavioral models as a seed design (1999) to an operator using a graphical user interface and receiving an indication of a preferred invocation for deriving the preferred design (3999), in which the graphical user interface presents the invocations in said seed design as boxes and the data dependencies as lines, where the width of each box is dependent on the execution delay of the corresponding invocation as derived from the added run times and number of times each loop body is executed.

8. A non-volatile storage medium comprising executable code for causing a processor to execute the method of claim 1.

9. A computer system configured for generating an embedded system (4999) comprising a parallelized hardware and/or software implementation of an original computer program (996), which parallelized implementation satisfies one or more criteria regarding hardware constraints of the embedded system (4999), the computer system comprising:

means for subjecting (1000) the original computer program (996) to static program analysis, comprising compiling the original computer program into an executable to obtain structural program models comprising control data flow graphs (1157) with static data dependencies and static data types, and to dynamic program analysis, comprising executing the executable on a host computer using test data, capturing the interactions with the observing a working memory of the host computer during the executing of the executable to identify sets of load and store operations of the original computer program that access the same memory locations as dynamic data dependencies, and capturing execution counts of code sections, to obtain structural and behavioral program models, means for deriving (2000) a preferred design (3999) that satisfies the one or more criteria regarding hardware constraints using the obtained structural and behavioral program models, and means for building (4000) the embedded system (4999) by transforming the design (3999) to a parallellized implementation that comprises a plurality of parallel processes that execute in software and/or hardware, characterized in that the means for subjecting (1000) the original computer program to the static and the dynamic program analysis are configured to so perform on a version of the original computer program (996) in which load and store instructions are annotated with information that links these instructions back to a specific part of a control-dataflow graph (1157), the means for subjecting (1000) being additionally configured for adding to the structural and the behavioral program models indications of memory dependencies and indications of streaming dependencies, the means for deriving (2000) the design (3999) being additionally configured for using the structural and behavioral program models and providing information about mutually parallel implementation of each part of the preferred design (3999), which comprises a) introducing a separation into different partitions of load and store instructions that have a detected streaming dependency between them, using the added indications of streaming dependencies from the models, b) introducing a separation into different partitions of load and store instructions that have a detected memory dependency with synchronization protection between them, using the added indications of memory dependencies from the models, c) retaining in a single partition load and store instructions that have another detected memory dependency between them, using the added indications of memory dependencies from the models, the means for deriving (2000) the design (3999) being additionally configured for a step of adding to the structural and behavioral program models indications of source lines and variables in said original computer program to relate the introduced partitions and the detected dependencies in the program model with locations in the original program source code, and the means for building (4000) the embedded system (4999) being additionally configured for specifying the preferred design (3999) by means of a series of changes to be made to the original computer program (996) based at least in part on the added indications, applying the series of changes to the original computer program (996), and using the thus-changed original computer program (996) in the building of the embedded system (4999).

\* \* \* \* \*